US009886577B2

(12) United States Patent
Sahita et al.

(10) Patent No.: US 9,886,577 B2
(45) Date of Patent: Feb. 6, 2018

(54) DETECTION AND MITIGATION OF MALICIOUS INVOCATION OF SENSITIVE CODE

(71) Applicant: McAfee, Inc., Santa Clara, CA (US)

(72) Inventors: Ravi Sahita, Portland, OR (US); Lu Deng, Santa Clara, CA (US); Vedvyas Shanbhogue, Austin, TX (US); Lixin Lu, San Jose, CA (US); Alexander Shepsen, Santa Clara, CA (US); Igor Tatourian, Santa Clara, CA (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/497,745

(22) Filed: Sep. 26, 2014

(65) Prior Publication Data

US 2016/0094571 A1 Mar. 31, 2016

(51) Int. Cl.
| | |
|---|---|
| *G06F 21/53* | (2013.01) |
| *G06F 12/14* | (2006.01) |
| *G06F 21/56* | (2013.01) |
| *G06F 12/10* | (2016.01) |
| *G06F 12/1009* | (2016.01) |
| *G06F 21/55* | (2013.01) |
| *H04L 29/06* | (2006.01) |

(52) U.S. Cl.
CPC .............. *G06F 21/53* (2013.01); *G06F 12/14* (2013.01); *G06F 12/145* (2013.01); *G06F 12/1458* (2013.01); *G06F 21/56* (2013.01); *G06F 12/10* (2013.01); *G06F 12/1009* (2013.01); *G06F 12/1441* (2013.01); *G06F 21/554* (2013.01); *H04L 63/1416* (2013.01)

(58) Field of Classification Search
CPC ...... G06F 12/10; G06F 12/1009; G06F 12/14; G06F 12/1441; G06F 12/145; G06F 12/1458; G06F 21/53; G06F 21/554; G06F 21/56; H04L 63/1416
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |
| 6,460,050 B1 | 10/2002 | Pace et al. |
| 7,506,155 B1 | 3/2009 | Stewart et al. |
| 7,984,304 B1 | 7/2011 | Waldspurger et al. |

(Continued)

FOREIGN PATENT DOCUMENTS

| | | | |
|---|---|---|---|
| WO | WO 2013/090045 A1 | 6/2013 | |
| WO | WO 2013089695 A1 * | 6/2013 | ............. G06F 21/44 |
| WO | WO 2016/048550 A1 | 3/2016 | |

OTHER PUBLICATIONS

International Search Report and Written Opinion in International Application No. PCT/US2015/046889, dated Dec. 4, 2015, 12 pages.

*Primary Examiner* — Theodore C Parsons
(74) *Attorney, Agent, or Firm* — Patent Capital Group

(57) ABSTRACT

Particular embodiments described herein provide for an electronic device that can be configured to identify regions of code to be monitored, probe and lock code pages that include the identified regions of code, and remap the code pages as execute only to assist with the mitigation of malicious invocation of sensitive code. The code pages can be remapped as execute only in an alternate extended page table view to allow for the detection and mitigation of malicious invocation of sensitive code.

20 Claims, 9 Drawing Sheets

(56) References Cited

U.S. PATENT DOCUMENTS

| | | |
|---|---|---|
| 2003/0200464 A1 | 10/2003 | Kidron |
| 2008/0256625 A1 | 10/2008 | Baskaran et al. |
| 2010/0281273 A1* | 11/2010 | Lee .................. G06F 21/72 713/190 |
| 2012/0167161 A1 | 6/2012 | Kim |
| 2013/0283370 A1* | 10/2013 | Vipat ................ G06F 21/44 726/17 |

* cited by examiner

```
→ 75264489        mov     edi,edi
  7526448B        push    ebp
  7526448C        mov     ebp,esp
  7526448E        push    0
  75264490        push    dword ptr [ebp+8]
  75264493        call    75263B63
  75264498        pop     ebp
  75264499        ret     4
```

FIG. 3A

| ENTRY OFFSET | STACK OFFSET |
|---|---|
| 0 | 0 |
| 2 | 0 |
| 3 | 4 |
| 5 | 8 |
| 7 | 12 |
| 10 | 16 |
| 15 | 12 |
| 16 | 8 |
| 20(INVALID) | 0 |

FIG. 3B

```
addr = 0x7526448C;
__asm
{
push    10H; //params setup by malware
call    cur_code;
cur_code:
add     [esp], 0xd;
mov     edi, edi;
push    ebp;
jmp     addr;
}
```
40 { (bracing lines push ebp; jmp addr;)

FIG. 3C

```
  75266489        mov     edi,edi
  7526448B        push    ebp
→ 7526448C        mov     ebp,esp
  7526448E        push    0
  75264490        push    dword ptr [ebp+8]
  75264493        call    75263B63
  75264498        pop     ebp
  75264499        ret     4
```

FIG. 3D

DETECTION AND MITIGATION OF MALICIOUS INVOCATION OF SENSITIVE CODE

TECHNICAL FIELD

This disclosure relates in general to the field of information security, and more particularly, to the detection and mitigation of malicious invocation of sensitive code.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3A is a simplified diagram of example details of a communication system for the detection and mitigation of malicious invocation of sensitive code in accordance with an embodiment of the present disclosure;

FIG. 3B is a simplified diagram of example details of a communication system for the detection and mitigation of malicious invocation of sensitive code in accordance with an embodiment of the present disclosure;

FIG. 3C is a simplified diagram of example details of a communication system for the detection and mitigation of malicious invocation of sensitive code in accordance with an embodiment of the present disclosure;

FIG. 3D is a simplified diagram of example details of a communication system for the detection and mitigation of malicious invocation of sensitive code in accordance with an embodiment of the present disclosure;

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
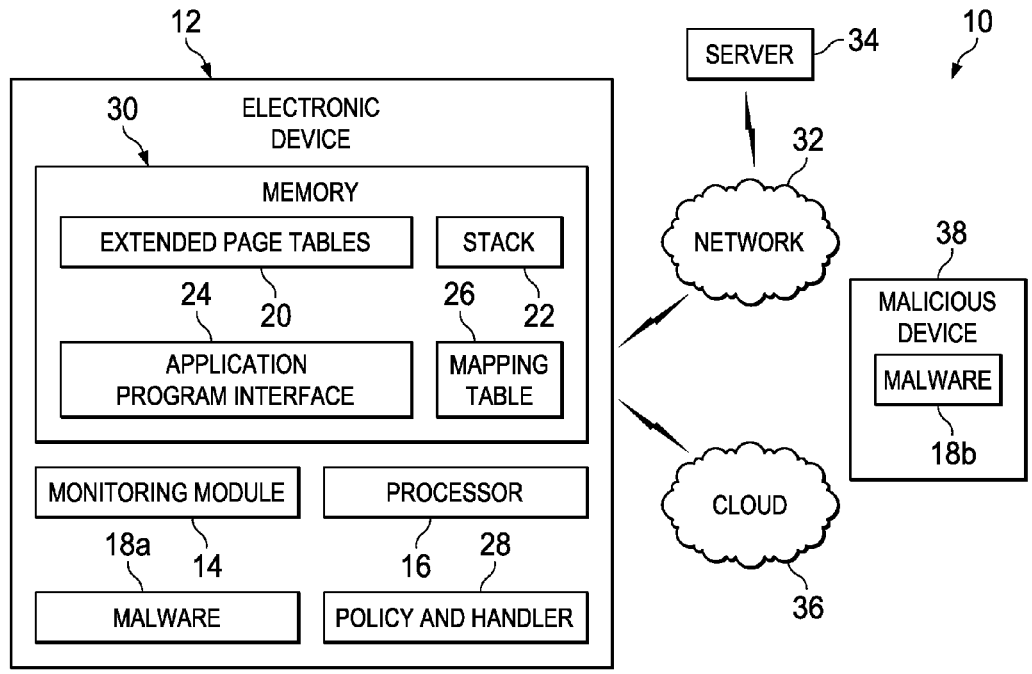
FIG. 1 is a simplified block diagram of a communication system for the detection and mitigation of malicious invocation of sensitive code in accordance with an embodiment of the present disclosure.

FIG. 1 is a simplified block diagram of a communication system 10 for the detection and mitigation of malicious invocation of sensitive code in accordance with an embodiment of the present disclosure. Communication system 10 can include an electronic device 12, a server 34, and a cloud 36. Electronic device 12 can include a monitoring module 14, a processor 16, a policy and handler 28, and memory 30. Memory 30 can include extended page tables (EPT) 20, a stack 22, application program interface (API) 24, and a mapping table 26. In an embodiment, electronic device 12 can include malware 18a.

A malicious device 38 can include malware 18b. Malicious device 38 may attempt to introduce malware 18b to electronic device 12. Electronic device 12, server 34, cloud 36, and malicious device 38 can be connected through network 32. In one example, malicious device 38 may be connected directly to electronic device 12 (e.g., through a USB type connection). Malicious device 38 may be any device that attempts to introduce malicious code (e.g., malware 18a or 18b) to electronic device 12.

In example embodiments, communication system 10 can be configured to include a system to provide detection of circumvention of hooks, jump oriented programming (JOP), return oriented programing (ROP), etc. to invoke sensitive APIs without requiring any hooks or patches on the sensitive API code and without any prior knowledge of the malware (e.g. no signatures required). Monitoring module 14 can be configured to mark code pages that contain sensitive API code pages as non-executable, thus being able to validate entries into the code sections using virtualization exceptions (#VE). Further the system can use the last exception record (LER) and last branch record (LBR) filtering capability to extract information about ring-3 (user-mode) indirect branches and to signal that an indirect CALLUMP or a RET (i.e., return to calling) was used to maliciously invoke sensitive API code on a monitored page (via interception using #VE).

Elements of FIG. 1 may be coupled to one another through one or more interfaces employing any suitable connections (wired or wireless), which provide viable pathways for network (e.g., network 32) communications. Additionally, any one or more of these elements of FIG. 1 may be combined or removed from the architecture based on particular configuration needs. Communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

For purposes of illustrating certain example techniques of communication system 10, it is important to understand the communications that may be traversing the network environment. The following foundational information may be viewed as a basis from which the present disclosure may be properly explained.

Security software can be used to monitor sensitive code execution by applying detours/hooks to envelope execution of sensitive APIs. Malware authors are well aware of these techniques applied by security software and can detect such hooks by reading the API code (e.g., comparing the code against an image on a disk or in memory, in tools like GMER or other tools for detecting and removing rootkits, etc.) or reading the code and analyzing the specific control flow patterns in the code of the API. Malware can also start executing such sensitive APIs by jumping into the middle of sensitive APIs (e.g., using a jmp command) to simply circumvent any security software detours/hooks completely. In this case, the security code simply does not see the sensitive APIs being executed maliciously, thus allowing the malware to execute, modify permissions, and stage an attack.

Current software approaches cannot detect hook-skipping attacks without full binary translation of the process code including the sensitive API code. In many cases, binary translation cannot be selectively enabled since the API hooks cannot be depended on as they can be circumvented. Hence, the binary translation has to be active all the time, causing performance overheads. What is needed is a system that can detect hook skip attacks without requiring patching to envelope the sensitive APIs and can detect malicious control flow into sensitive APIs without requiring any patching of process data structures or code.

A communication system for the detection and mitigation of malicious invocation of sensitive code, as outlined in FIG. 1, can resolve these issues (and others). Communication system 10 may be configured to include a system where monitoring module 14 specifies policy to a #VE policy manager and handler (e.g., policy and handler 28). In an embodiment, the #VE policy manager and handler updates EPTs (e.g., EPTs 20) managed by a hypervisor to de-privilege specific API pages from being executed in the default EPT view and to create an alternate mapping for the execution of the pages. The #VE policy manager and handler enables #VE exception delivery for these specific pages. When an execution of the API occurs (either a normal or malicious execution), an EPT fault in the untrusted view is reported. The report can be as a violation of a #VE exception to the #VE manager and handler and the #VE manager and handler can dispatch the event to the monitoring module 14, which inspects the received context information (e.g., entry point, offset of invocation, etc.) and invokes an API-specific wrapper or analysis code.

If the entry point of the API is not at the proper entry point, (i.e. the offset is non-zero), then one of two approaches may be used to locate the parameters that the calling code has set upon the stack. In a first approach, a mapping table (e.g., mapping table 26) that maps the entry offset to stack offset is used to map the entry offset to the stack offset that should be used to access the parameters on the stack. A second approach can locate the stack parameters based on the offset of entry into the monitored code past the entry point and by using a decode of the instructions to identify stack operations and evaluate the offset needed to adjust the stack.

Turning to the infrastructure of FIG. 1, communication system 10 in accordance with an example embodiment is shown. Generally, communication system 10 can be implemented in any type or topology of networks. Network 32 represents a series of points or nodes of interconnected communication paths for receiving and transmitting packets of information that propagate through communication system 10. Network 32 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 10, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 10. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 12, server 34, and cloud 36 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 10, each of electronic device 12, server 34, and cloud 36 can include memory elements for storing information to be used in the operations outlined herein. Each of electronic device 12, server 34, and cloud 36 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 10 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 10, such as electronic device 12, server 34, and cloud 36 may include software modules (e.g., monitoring module 14) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 12, server 34, and cloud 36 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 12 can be a network element and includes, for example, desktop computers, laptop computers, mobile devices, personal digital assistants, smartphones, tablets, or other similar devices. Server 34 can be a network element such as a server or virtual server and can be associated with clients, customers, endpoints, or end users wishing to initiate a communication in communication system 10 via some network (e.g., network 32). The term 'server' is inclusive of devices used to serve the requests of clients and/or perform some computational task on behalf of clients within communication system 10. Although monitoring module 14 is represented in FIG. 1 as being located in electronic device 12 this is for illustrative purposes only. Monitoring module 14 could be combined or separated in any suitable configuration. Furthermore, monitoring module 14 could be integrated with or distributed in another network accessible by electronic device 12 such as server 34 or cloud 36. Cloud 36 is configured to provide cloud services to electronic device 12. Cloud services may generally be defined as the use of computing resources that are delivered as a service over a network, such as the Internet. Typically, compute, storage, and network resources are offered in a cloud infrastructure, effectively shifting the workload from a local network to the cloud network.

Figure 2:
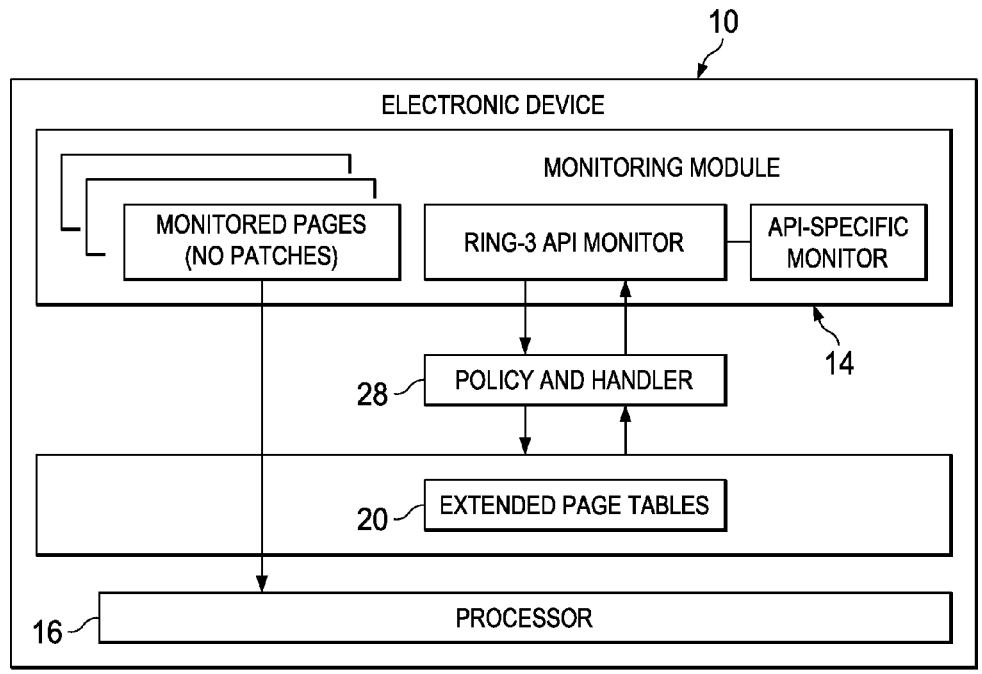
FIG. 2 is a simplified block diagram of a portion of a communication system for the detection and mitigation of malicious invocation of sensitive code in accordance with an embodiment of the present disclosure.

Turning to FIG. 2, FIG. 2 is a simplified block diagram of a portion of a communication system 10 for the detection and mitigation of malicious invocation of sensitive code in accordance with an embodiment of the present disclosure. FIG. 2 illustrates an example operation for the detection and mitigation of malicious invocation of sensitive code in accordance with an embodiment of the present disclosure. Monitoring module 14 can specify a ring 3-API monitoring policy to policy and handler 28. Policy and handler 28 can update EPTs 20 to de-privilege specific API pages from being executed in a default EPT view and to create an alternate mapping for execution of the specific API pages. Policy and handler 28 can also enable exception delivery (e.g., #VE exception delivery) for the specific API pages. When execution of the specific API pages occurs, an EPT fault in an untrusted view is reported. The reported fault is reported as an exception and sent to monitoring module 14. Monitoring module 14 can inspect the context information related to the exception and if the API entry point is not at the proper entry point, then a mapping table (e.g., mapping table 26) that maps the entry offset to the stack offset can be used to map the entry offset that should be used to access the parameters on the stack (e.g., stack 22). An alternate approach may be to locate the stack parameters based on the offset of entry into the monitored pages past the entry point using a decode of the instructions to identify stack operation and evaluate the offset needed to adjust the stack.

Turning to FIG. 3A, FIG. 3A is a simplified diagram of a portion of a communication system for the detection and mitigation of malicious invocation of sensitive code in accordance with an embodiment of the present disclosure. FIG. 3A illustrates a normal invocation of a 32 bit function. Entry point Ox75264489 is reported as entrypoint=Ox75264489, offset OxO. The parameters (not shown) can be setup by the calling function. Turning to FIG. 3B, FIG. 3B is a simplified diagram of a portion of a communication system for the detection and mitigation of malicious invocation of sensitive code in accordance with an embodiment of the present disclosure. FIG. 3B illustrates a mapping table for the 32 bit function illustrated in FIG. 3B for the function at entry point Ox75264489.

Turning to FIGS. 3C and 3D, FIGS. 3C and 3D are a simplified diagrams of a portion of a communication system for the detection and mitigation of malicious invocation of sensitive code in accordance with an embodiment of the present disclosure. FIG. 3C illustrates a malicious invocation 40 of the function shown in FIG. 3A. The malicious invocation can jump past code into the middle of the API at address Ox7526448C. The malicious invocation 40 can be code execute by malware 18*a* before jumping into the middle of the instruction stream. The callback is invoked with entrypoint "Ox75264489, offset" Ox3. For this example, the address Ox7526448C is used (in this case hard-coded) to illustrate the concept however, these addresses are typically discovered via some memory disclosure as part of the vulnerability exploited by malware 18*a*.

Since the entry-point offset is Ox3, the mapping table (e.g., mapping table 26) can provide a stack-offset of 4, which can be used by monitoring module 14 to read the parameters from stack 22. Note that for malware to use the API successfully, the malware must not corrupt the stack and follow the convention expected by the API.

Figure 4:
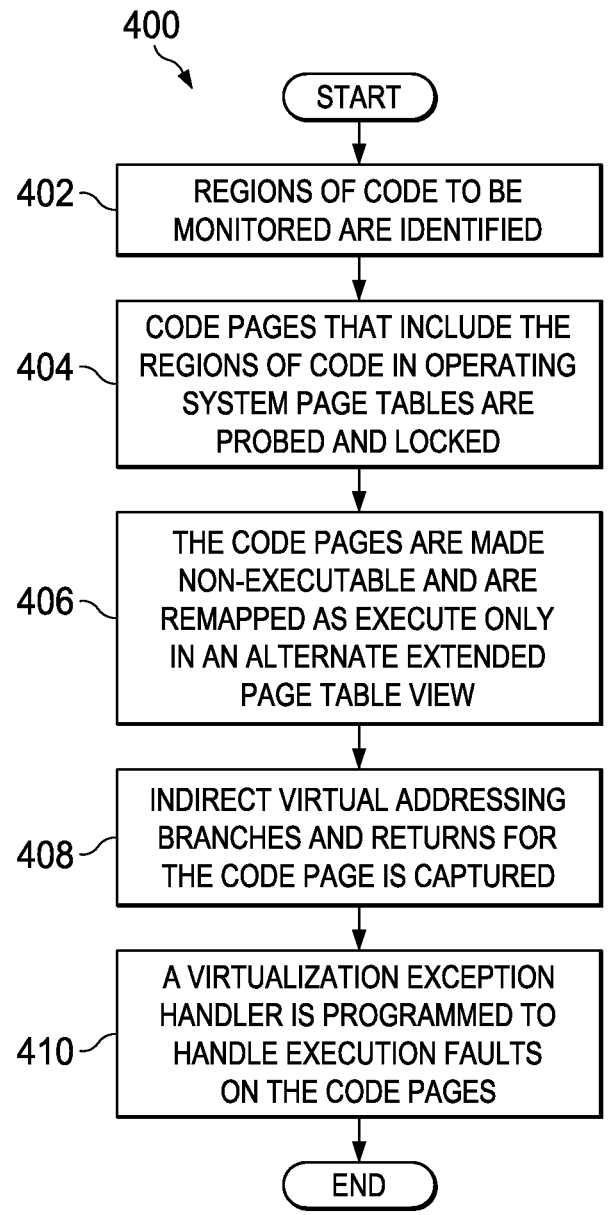
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with the detection and mitigation of malicious invocation of sensitive code, in accordance with an embodiment. In an embodiment, one or more operations of flow 400 may be performed by monitoring module 14. At 402, regions of code to be monitored are identified. At 404, code pages that include the regions of code in operating system page tables are probed and locked. At 406, the code pages are made non-executable and are remapped as execute only in an alternate extended page table view. At 408, indirect virtual addressing branches and returns for the code page are captured. At 410, a virtualization exception handler is programmed to handle execution faults on the code pages.

Figure 5:
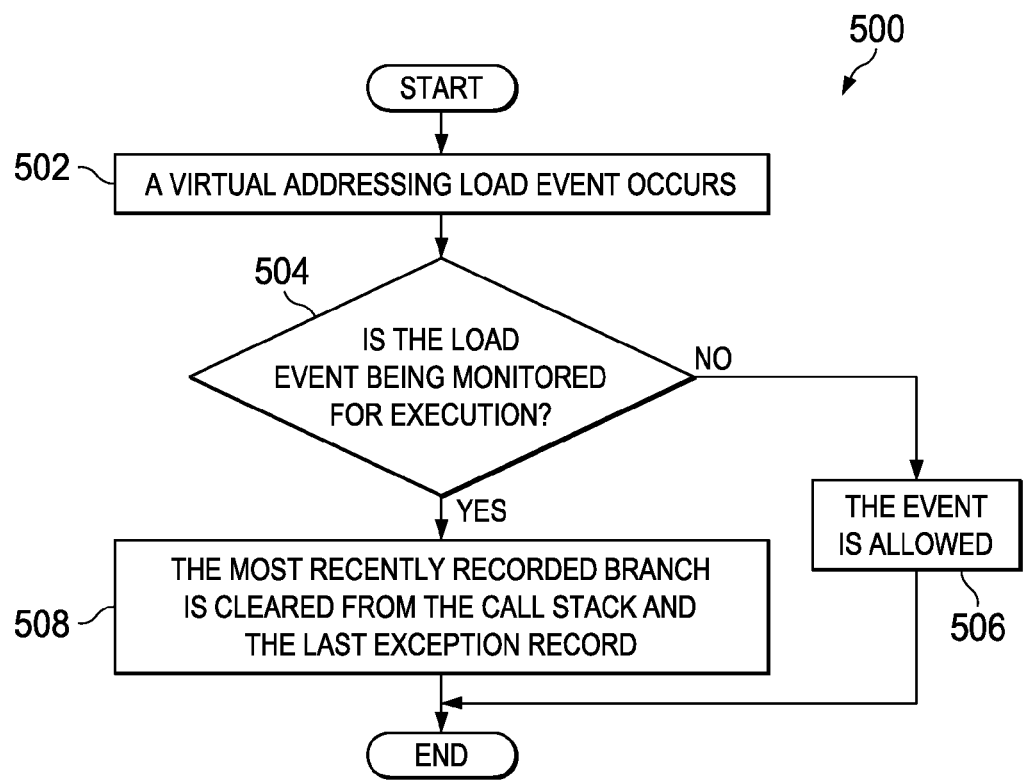
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with the detection and mitigation of malicious invocation of sensitive code, in accordance with an embodiment. In an embodiment, one or more operations of flow 500 may be performed by monitoring module 14. At 502, a virtual addressing load event occurs. At 504, the system determines if the load event is being monitored for execution (e.g., API execution). If the load event is not being monitored for execution, then the event is allowed, as in 504. If the load event is being monitored for execution, then the most recently recorded branch is cleared from the call stack and the last exception is recorded, as in 508.

Figure 6:
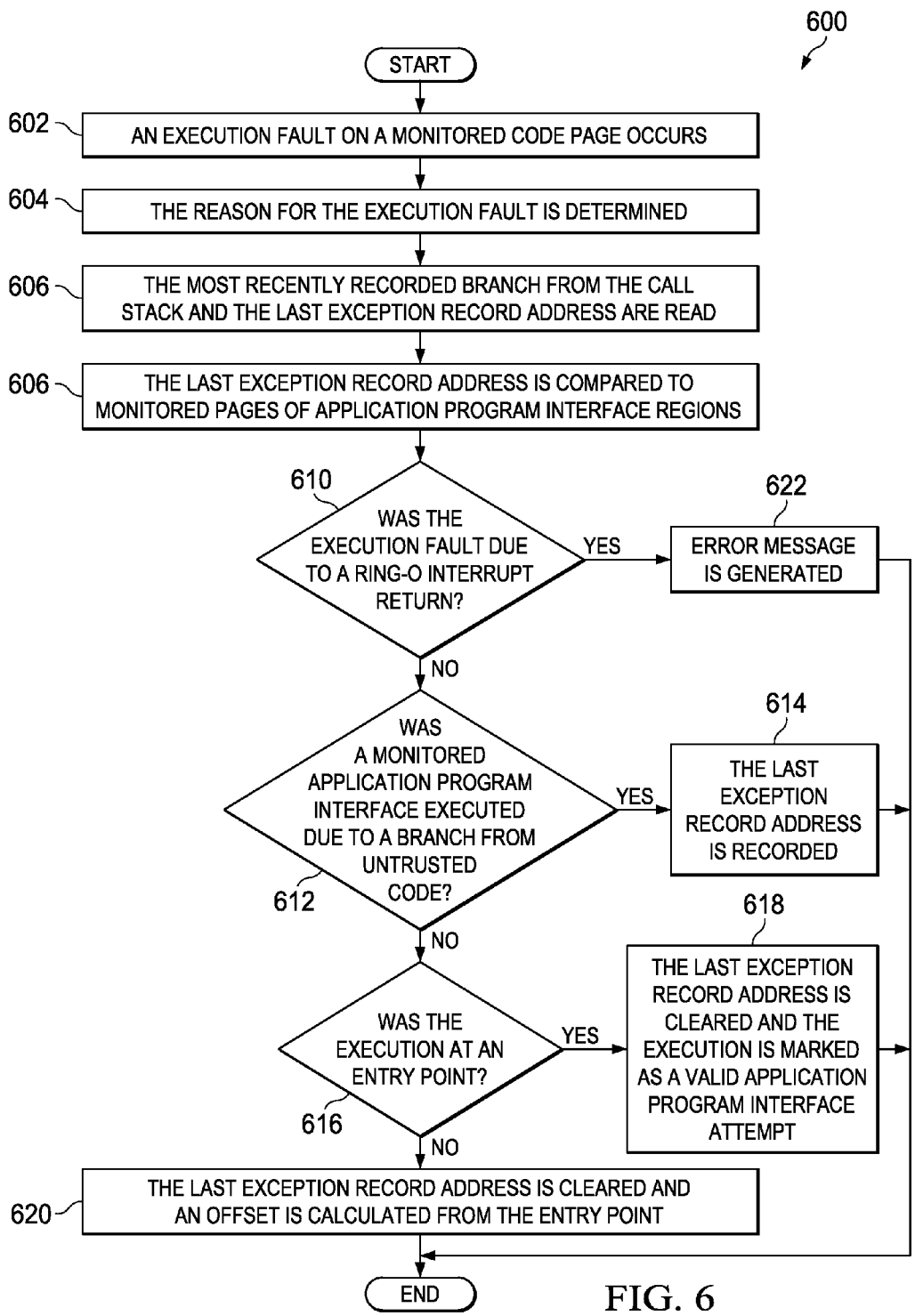
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with the detection and mitigation of malicious invocation of sensitive code, in accordance with an embodiment. In an embodiment, one or more operations of flow 600 may be performed by monitoring module 14. At 602, an execution fault on a monitored code page occurs. At 604, the reason for the execution fault is determined. At 606, the most recently recorded branch from the call stack and the last exception record address are read. At 606, the last exception record address is compared to monitored pages of application program interface regions. At 608, the system determines if the execution fault was due to a ring-0 interrupt return. If the execution fault was due to a ring-0 interrupt return, then an error message is generated, as in 622. If the execution fault was not due to a ring-0 interrupt, then the system determines if a monitored application program interface was executed due to a branch from untrusted code, as in 612. If the monitored application program interface was executed due to a branch from untrusted code, then the last exception record address is recorded, as in 614. If the monitored application program interface was not executed due to a branch from untrusted code, then they system determines if the execution was at an entry point, as in 616. If the execution was at an entry point, then the last exception record address is cleared and the execution is marked as a valid application program interface attempt, as in 618. If the execution was not at an entry point, then the last exception record address is cleared and an offset is calculated from the entry point, as in 620.

Figure 7:
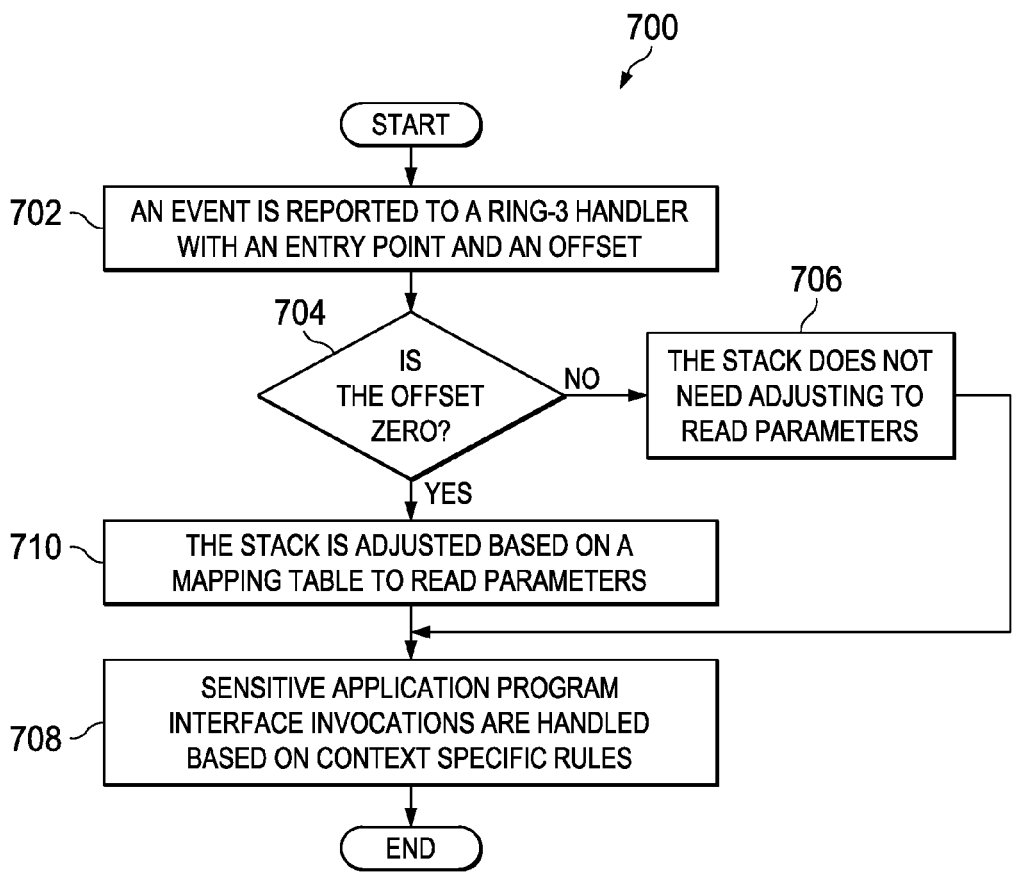
FIG. 7 is a simplified flowchart illustrating potential operations that may be associated with the communication system in accordance with an embodiment.

Turning to FIG. 7, FIG. 7 is an example flowchart illustrating possible operations of a flow 700 that may be associated with the detection and mitigation of malicious invocation of sensitive code, in accordance with an embodiment. In an embodiment, one or more operations of flow 700 may be performed by monitoring module 14. At 702, an event is reported to a ring-3 handler with an entry point and an offset. At 704, the system determines if the offset is zero. If the offset is zero, then the stack does not need adjusting to read parameters, as in 706. If the offset is not zero, then the stack is adjusted based on a mapping table to read parameters, as in 710. At 708, sensitive application program interface invocations are handled based on context specific rules.

Figure 8:
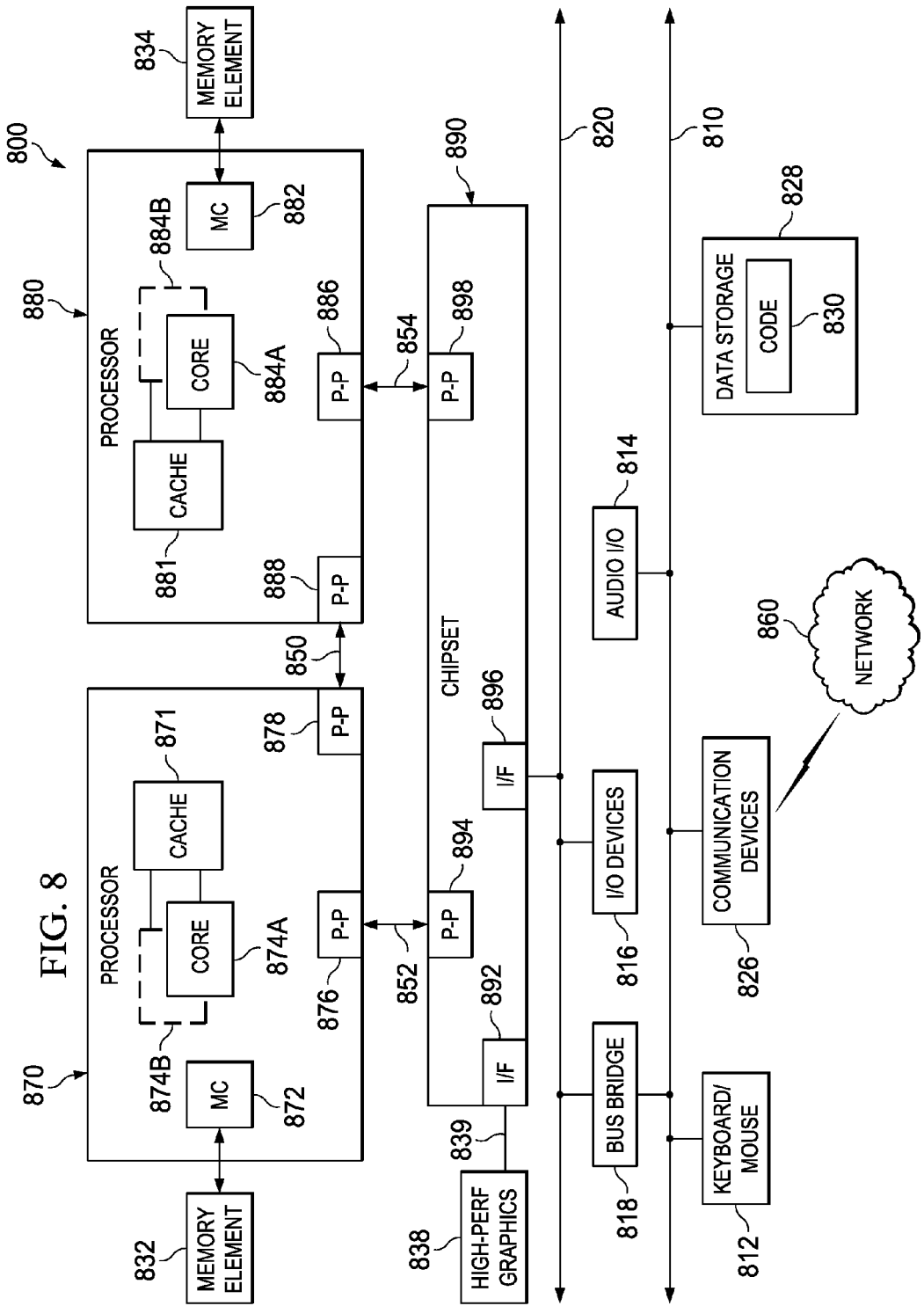
FIG. 8 is a block diagram illustrating an example computing system that is arranged in a point-to-point configuration in accordance with an embodiment.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the network elements of communication system 10 may be configured in the same or similar manner as computing system 800.

As illustrated in FIG. 8, system 800 may include several processors, of which only two, processors 870 and 880, are shown for clarity. While two processors 870 and 880 are shown, it is to be understood that an embodiment of system 800 may also include only one such processor. Processors 870 and 880 may each include a set of cores (i.e., processor cores 874A and 874B and processor cores 884A and 884B) to execute multiple threads of a program. The cores may be configured to execute instruction code in a manner similar to that discussed above with reference to FIGS. 1-7. Each processor 870, 880 may include at least one shared cache 871, 881. Shared caches 871, 881 may store data (e.g., instructions) that are utilized by one or more components of processors 870, 880, such as processor cores 874 and 884.

Processors 870 and 880 may also each include integrated memory controller logic (MC) 872 and 882 to communicate with memory elements 832 and 834. Memory elements 832 and/or 834 may store various data used by processors 870 and 880. In alternative embodiments, memory controller logic 872 and 882 may be discrete logic separate from processors 870 and 880.

Processors 870 and 880 may be any type of processor and may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a keyboard/mouse 812 (or other input devices such as a touch screen, trackball, etc.), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 9:
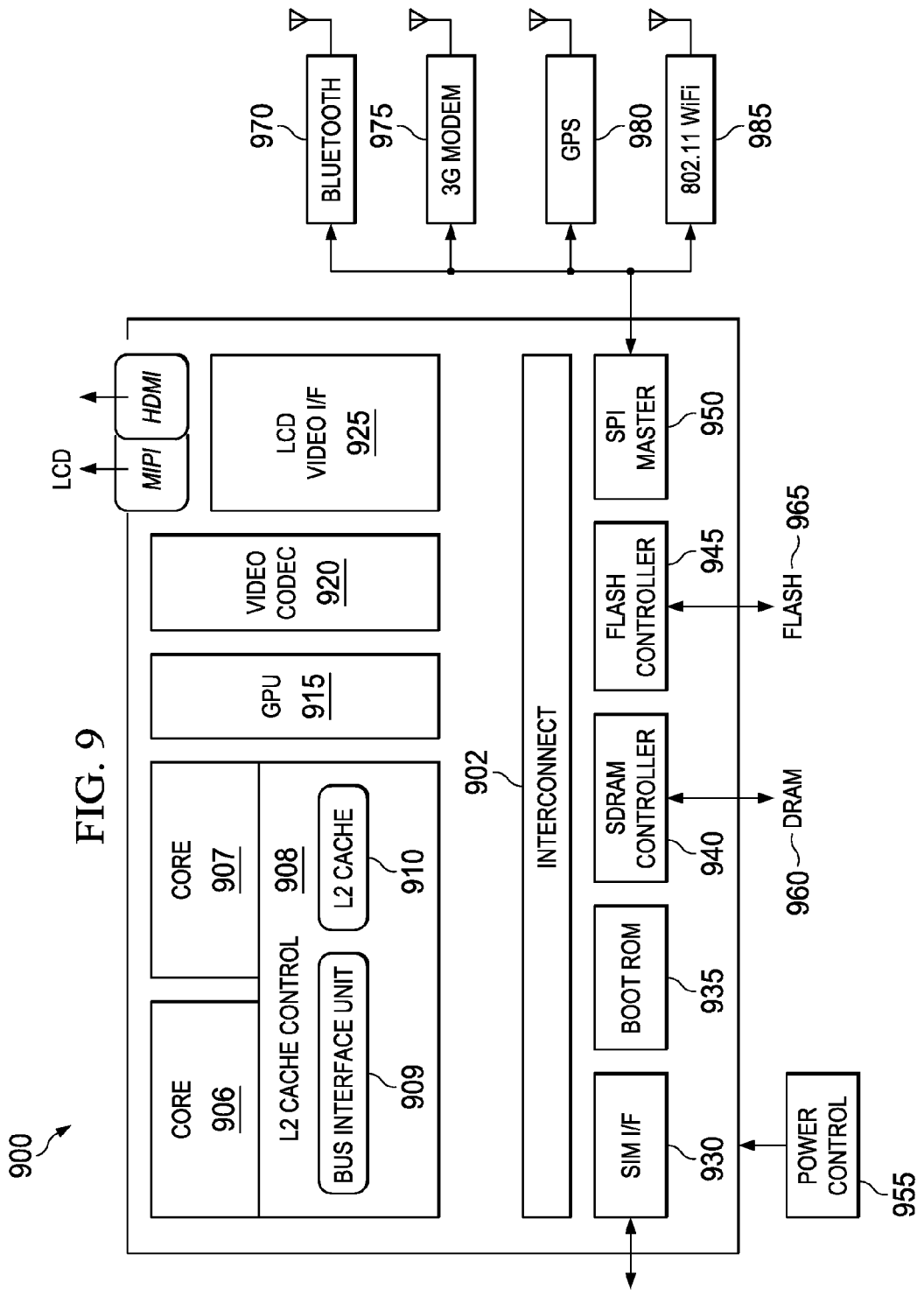
FIG. 9 is a simplified block diagram associated with an example ARM ecosystem system on chip (SOC) of the present disclosure.

Turning to FIG. 9, FIG. 9 is a simplified block diagram associated with an example ARM ecosystem SOC 900 of the present disclosure. At least one example implementation of the present disclosure can include the tracing and detection features discussed herein and an ARM component. For example, the example of FIG. 9 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 9, ARM ecosystem SOC 900 may include multiple cores 906-907, an L2 cache control 908, a bus interface unit 909, an L2 cache 910, a graphics processing unit (GPU) 915, an interconnect 902, a video codec 920, and a liquid crystal display (LCD) I/F 925, which may be associated with mobile industry processor interface (MIPI)/high-definition multimedia interface (HDMI) links that couple to an LCD.

ARM ecosystem SOC 900 may also include a subscriber identity module (SIM) I/F 930, a boot read-only memory (ROM) 935, a synchronous dynamic random access memory (SDRAM) controller 940, a flash controller 945, a serial peripheral interface (SPI) master 950, a suitable power control 955, a dynamic RAM (DRAM) 960, and flash 965. In addition, one or more example embodiments include one or more communication capabilities, interfaces, and features such as instances of Bluetooth™ 970, a 3G modem 975, a global positioning system (GPS) 980, and an 802.11 Wi-Fi 985.

In operation, the example of FIG. 9 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 10:
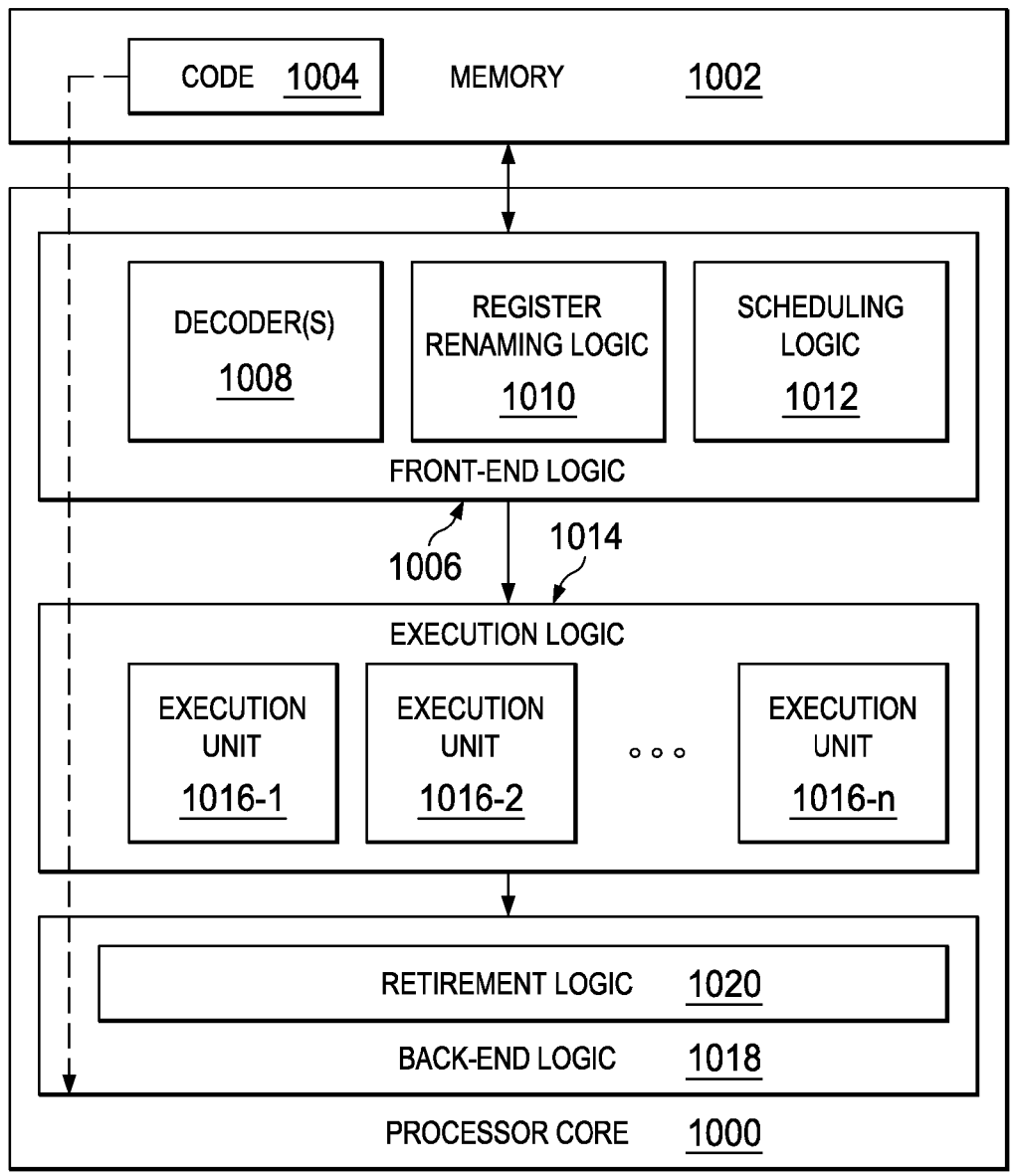
FIG. 10 is a block diagram illustrating an example processor core in accordance with an embodiment.

FIG. 10 illustrates a processor core 1000 according to an embodiment. Processor core 1000 may be the core for any type of processor, such as a micro-processor, an embedded processor, a digital signal processor (DSP), a network processor, or other device to execute code. Although only one processor core 1000 is illustrated in FIG. 10, a processor may alternatively include more than one of the processor core 1000 illustrated in FIG. 10. For example, processor core 1000 represents one example embodiment of processors cores 674a, 874b, 884a, and 884b shown and described with reference to processors 870 and 880 of FIG. 8. Processor core 1000 may be a single-threaded core or, for at least one embodiment, processor core 1000 may be multithreaded in that it may include more than one hardware thread context (or "logical processor") per core.

FIG. 10 also illustrates a memory 1002 coupled to processor core 1000 in accordance with an embodiment. Memory 1002 may be any of a wide variety of memories (including various layers of memory hierarchy) as are known or otherwise available to those of skill in the art. Memory 1002 may include code 1004, which may be one or more instructions, to be executed by processor core 1000. Processor core 1000 can follow a program sequence of instructions indicated by code 1004. Each instruction enters a front-end logic 1006 and is processed by one or more decoders 1008. The decoder may generate, as its output, a micro operation such as a fixed width micro operation in a predefined format, or may generate other instructions, microinstructions, or control signals that reflect the original code instruction. Front-end logic 1006 also includes register renaming logic 1010 and scheduling logic 1012, which generally allocate resources and queue the operation corresponding to the instruction for execution.

Processor core 1000 can also include execution logic 1014 having a set of execution units 1016-1 through 1016-N. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 can retire the instructions of code 1004. In one embodiment, processor core 1000 allows out of order execution but requires in order retirement of instructions. Retirement logic 1020 may take a variety of known forms (e.g., re-order buffers or the like). In this manner, processor core 1000 is transformed during execution of code 1004, at least in terms of the output generated by the decoder, hardware registers and tables utilized by register renaming logic 1010, and any registers (not shown) modified by execution logic 1014.

Although not illustrated in FIG. 10, a processor may include other elements on a chip with processor core 1000, at least some of which were shown and described herein with reference to FIG. 8. For example, as shown in FIG. 8, a processor may include memory control logic along with processor core 1000. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 10 and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations in the preceding flow diagrams (i.e., FIGS. 4-7) illustrate only some of the possible correlating scenarios and patterns that may be executed by, or within, communication system 10. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 10 has been illustrated with reference to particular elements and operations that facilitate the communication process, these elements and operations may be replaced by any suitable architecture, protocols, and/or processes that achieve the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes And Examples

Example C1 is at least one machine readable storage medium having one or more instructions that when executed by at least one processor cause the at least one processor to identify regions of code to be monitored, probe and lock code pages that include the identified regions of code, and remap the code pages as execute only.

In Example C2, the subject matter of Example C1 can optionally include where the code pages are remapped as execute only in an alternate extended page table view.

In Example C3, the subject matter of any one of Examples C1-C2 can optionally include where the instructions, when executed by the at least one processor, further cause the at least one processor to capture indirect virtual addressing branches and returns for the code pages.

In Example C4, the subject matter of any one of Examples C1-C3 can optionally include where the instructions, when executed by the at least one processor, further cause the at least one processor to receive an application program interface execution request for the code pages and generate an execution fault in response to the request.

In Example C5, the subject matter of any one of Examples C1-C4 can optionally include where the instructions, when executed by the at least one processor, further cause the at least one processor to handle execution faults on the code pages with a virtualized exception handler.

In Example C6, the subject matter of any one of Example C1-C5 can optionally include where the execution fault is an extended page table fault.

In Example C7, the subject matter of any one of Examples C1-C6 can optionally include where the instructions, when executed by the at least one processor, further cause the at least one processor to inspect context information related to the execution fault to determine if an entry point for the application program interface execution request is valid.

In Example C8, the subject matter of any one of Examples C1-C7 can optionally include where the instructions, when executed by the at least one processor, further cause the at least one processor to map the entry offset to the stack offset if the entry point is not valid.

In Example A1, an apparatus can include a monitoring module, where the monitoring module is configured to identify regions of code to be monitored, probe and lock code pages that include the identified regions of code, and remap the code pages as execute only.

In Example, A2, the subject matter of Example A1 can optionally include where the monitoring module is further configured to remap the code pages as execute only in an alternate extended page table view.

In Example A3, the subject matter of any one of Examples A1-A2 can optionally include where the monitoring module is further configured to capture indirect virtual addressing branches and returns for the code pages.

In Example A4, the subject matter of any one of Examples A1-A3 can optionally include where the monitoring module is further configured to receive an application program interface execution request for the code pages and generate an execution fault in response to the request.

In Example A5, the subject matter of any one of Examples A1-A4 can optionally include where the monitoring module is further configured to handle execution faults on the code pages with a virtualized exception handler.

In Example A6, the subject matter of any one of Examples A1-A5 can optionally include where the execution fault is an extended page table fault.

In Example A7, the subject matter of any one of Examples A1-A6 can optionally include where the monitoring module is further configured to inspect context information related to the execution fault to determine if an entry point for the application program interface execution request is valid.

In Example A8, the subject matter of any one of Examples A1-A7 can optionally include where the monitoring module is further configured to map the entry offset to the stack offset if the entry point is not valid.

Example M1 is a method including identifying regions of code to be monitored, probing and locking code pages that include the identified regions of code, and remapping the code pages as execute only.

In Example M2, the subject matter of Example M1 can optionally include where the code pages are remapped as execute only in an alternate extended page table view.

In Example M3, the subject matter of any one of the Examples M1-M2 can optionally include capturing indirect virtual addressing branches and returns for the code pages.

In Example M4, the subject matter of any one of the Examples M1-M3 can optionally include receiving an application program interface execution request for the code pages and generating an execution fault in response to the request.

In Example M5, the subject matter of any one of the Examples M1-M4 can optionally include handling execution faults on the code pages with a virtualized exception handler.

In Example M6, the subject matter of any one of the Examples M1-M5 can optionally include where the execution fault is an extended page table fault.

In Example M7, the subject matter of any one of the Examples M1-M6 can optionally include inspecting context information related to the execution fault to determine if an entry point for the application program interface execution request is valid and mapping the entry offset to the stack offset if the entry point is not valid.

Example S1 is a system for detecting and mitigating malicious invocation of sensitive code, the system including a monitoring module configured for identifying regions of code to be monitored, probing and locking code pages that include the identified regions of code, and remapping the code pages as execute only, where the code pages are remapped as execute only in an alternate extended page table view.

In Example S2, the subject matter of Example S1 can optionally include the monitoring module being further configured to receive an application program interface execution request for the code pages, generate an execution fault in response to the request, and inspect context information related to the execution fault to determine if an entry point for the application program interface execution request is valid.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory computer-readable medium comprising one or more instructions that when executed by at least one processor:
   identify regions of code in an extended page table that includes API code pages to be monitored;
   probe and lock code pages that include the identified regions of code;
   remap the code pages as executable in an alternate extended page table view only;
   detect a page load, wherein the page load is for a page that does not include the proper entry point of an API;
   determine, based on detecting the page load of the page that does not include the proper entry point of the API, from the extended page table whether the page is to be monitored; and
   generate, based on the determination that the page is to be monitored, an execution fault.

2. The at least one computer-readable medium of claim 1, further comprising one or more instructions that when executed by the at least one processor:
   capture indirect virtual addressing branches and returns for the code pages.

3. The at least one computer-readable medium of claim 1, further comprising one or more instructions that when executed by the at least one processor:
   handle execution faults on the code pages with a virtualized exception handler.

4. The at least one computer-readable medium of claim 1, wherein the execution fault is an extended page table fault.

5. The at least one computer-readable medium of claim 1, further comprising one or more instructions that when executed by the at least one processor:
   inspect context information related to the execution fault to determine if an entry point for the application program interface execution request is valid.

6. The at least one computer-readable medium of claim 5, further comprising one or more instructions that when executed by the at least one processor:
   map the entry offset to the stack offset if the entry point is not valid.

7. The at least one computer-readable medium of claim 1, further comprising one or more instructions that when executed by the at least one processor:
   de-privilege the identified regions of code from being executed in a default extended page table view.

8. An apparatus comprising:
   memory; and
   a monitoring module in the memory configured to:
      identify regions of code in an extended page table that includes sensitive API code pages to be monitored;
      probe and lock code pages that include the identified regions of code;
      remap the code pages as executable in an alternate extended page table view only;
      detect a page load, wherein the page load is for loading a page that does not include the proper entry point of an API;
      determine, based on detecting the page load of the page that does not include the proper entry point of the API, from the extended page table whether the page is to be monitored; and
      generate, based on the determination that the page is to be monitored, an execution fault.

9. The apparatus of claim 8, wherein the monitoring module is further configured to:
   capture indirect virtual addressing branches and returns for the code pages.

10. The apparatus of claim 8, wherein the monitoring module is further configured to:
    handle execution faults on the code pages with a virtualized exception handler.

11. The apparatus of claim 8, wherein the monitoring module fault is an extended page table fault.

12. The apparatus of claim 8, wherein the monitoring module is further configured to:
    inspect context information related to the execution fault to determine if an entry point for the application program interface execution request is valid.

13. The apparatus of claim 12, wherein the monitoring module is further configured to:
map the entry offset to the stack offset if the entry point is not valid.

14. A method comprising:
identifying regions of code in an extended page table that includes API code pages to be monitored;
probing and locking code pages that include the identified regions of code;
remapping the code pages as executable in an alternate extended page table view only;
detecting a page load, wherein the page load is for loading a page that does not include the proper entry point of an API;
determining, based on detecting the page load of the page that does not include the proper entry point of the API, from the extended page table whether the page is to be monitored; and
generating, based on the determination that the page is to be monitored, an execution fault.

15. The method of claim 14, further comprising:
capturing indirect virtual addressing branches and returns for the code pages.

16. The method of claim 14, further comprising:
handling execution faults on the code pages with a virtualized exception handler.

17. The method of claim 14, wherein the execution fault is an extended page table fault.

18. The method of claim 14, further comprising:
inspecting context information related to the execution fault to determine if an entry point for the application program interface execution request is valid; and
mapping the entry offset to the stack offset if the entry point is not valid.

19. A system for detecting and mitigating malicious invocation of sensitive code, the system comprising:
memory; and
a monitoring module in the memory configured for:
identifying regions of code in an extended page table that includes API code pages to be monitored;
probing and locking code pages that include the identified regions of code;
remapping the code pages as executable in an alternate extended page table view only;
detecting a page load, wherein the page load is for a page that does not include the proper entry point of an API;
determining, based on detecting the page load of the page that does not include the proper entry point of the API, from the extended page table whether the page is to be monitored; and
generating, based on the determination that the page is to be monitored, an execution fault.

20. The system of claim 19, wherein the system is configured to:
inspect context information related to the execution fault to determine if an entry point for the application program interface execution request is valid.

* * * * *